(12) United States Patent
Kim et al.

(10) Patent No.: US 10,516,907 B2
(45) Date of Patent: Dec. 24, 2019

(54) DEVICE AND METHOD FOR PROCESSING VIDEO

(71) Applicant: SAMSUNG ELECTRONICS CO., LTD., Suwon-si (KR)

(72) Inventors: Chan-yul Kim, Bucheon-si (KR); Joon-hyun Lee, Seoul (KR); Jeong-hoon Park, Seoul (KR); Myung-jin Eom, Seoul (KR); Ho-cheon Wey, Seongnam-si (KR); Sun-il Lee, Seoul (KR); Kwang-pyo Choi, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/129,604

(22) PCT Filed: May 1, 2015

(86) PCT No.: PCT/KR2015/004456
§ 371 (c)(1),
(2) Date: Sep. 27, 2016

(87) PCT Pub. No.: WO2015/167312
PCT Pub. Date: Nov. 5, 2015

(65) Prior Publication Data
US 2017/0163423 A1    Jun. 8, 2017

(30) Foreign Application Priority Data
May 2, 2014    (KR) ......................... 10-2014-0053628

(51) Int. Cl.
*H04N 21/235*    (2011.01)
*H04N 21/266*    (2011.01)
(Continued)

(52) U.S. Cl.
CPC ....... *H04N 21/2541* (2013.01); *H04N 21/236* (2013.01); *H04N 21/2343* (2013.01);
(Continued)

(58) Field of Classification Search
CPC ............. H04N 21/254; H04N 21/2541; H04N 21/235; H04N 21/2351; H04N 21/266;
(Continued)

(56) References Cited

U.S. PATENT DOCUMENTS 5,805,700 A * 9/1998 Nardone .............. H04N 7/1675
348/425.3
6,226,618 B1 * 5/2001 Downs .................... G06F 21/10
705/51
(Continued)

FOREIGN PATENT DOCUMENTS

CN       103020492 A    4/2013
EP       2 219 128 A2   8/2010
(Continued)

OTHER PUBLICATIONS

Office Action dated May 29, 2015, issued by the Korean Intellectual Property Office in counterpart Korean Patent Application No. 10-2014-0053628.
(Continued)

*Primary Examiner* — James R Sheleheda
(74) *Attorney, Agent, or Firm* — Sughrue Mion, PLLC

(57) ABSTRACT

Provided is a video processing device and method capable of managing a security level of content included in a video. The video processing method includes: receiving an identifier of a video and information about a security policy to be set to the video; receiving security information related to the security policy; preparing the video by using the received identifier of the video; and updating security information of
(Continued)

the prepared video by using the received security information according to the security policy.

13 Claims, 4 Drawing Sheets

(51) Int. Cl.
| | |
|---|---|
| H04N 21/4408 | (2011.01) |
| H04N 21/2343 | (2011.01) |
| H04N 21/236 | (2011.01) |
| H04N 21/4402 | (2011.01) |
| H04N 21/8355 | (2011.01) |
| H04N 21/254 | (2011.01) |
| H04N 21/4627 | (2011.01) |

(52) U.S. Cl.
CPC ... *H04N 21/2351* (2013.01); *H04N 21/23614* (2013.01); *H04N 21/266* (2013.01); *H04N 21/4402* (2013.01); *H04N 21/4408* (2013.01); *H04N 21/440245* (2013.01); *H04N 21/4627* (2013.01); *H04N 21/8355* (2013.01)

(58) Field of Classification Search
CPC ....... H04N 21/26606; H04N 21/26613; H04N 21/2343; H04N 21/236; H04N 21/23614; H04N 21/4402; H04N 21/440245; H04N 21/4408; H04N 21/4627; H04N 21/8355
See application file for complete search history.

(56) References Cited

U.S. PATENT DOCUMENTS

| | | | |
|---|---|---|---|
| 6,526,171 B1* | 2/2003 | Furukawa | H04N 21/23892 375/E7.018 |
| 6,697,944 B1* | 2/2004 | Jones | G06F 21/10 705/50 |
| 6,931,531 B1* | 8/2005 | Takahashi | H04N 5/913 348/E7.056 |
| 7,151,832 B1* | 12/2006 | Fetkovich | G06F 21/606 380/210 |
| 7,161,615 B2* | 1/2007 | Pretzer | G08B 13/19686 348/143 |
| 7,167,560 B2* | 1/2007 | Yu | H04L 63/0428 348/E7.056 |
| 7,406,176 B2* | 7/2008 | Zhu | H04N 7/1675 348/E7.056 |
| 8,127,368 B2* | 2/2012 | Hirota | G06F 21/10 711/163 |
| 8,447,034 B2* | 5/2013 | Le Barz | H04N 7/1675 380/217 |
| 8,543,804 B2 | 9/2013 | Moon et al. | |
| 8,752,197 B2* | 6/2014 | Bolle | H04L 9/0847 726/28 |
| 8,929,545 B2* | 1/2015 | Kim | H04L 9/08 380/210 |
| 9,003,558 B1* | 4/2015 | Dorwin | H04L 47/801 726/30 |
| 2001/0053222 A1* | 12/2001 | Wakao et al. | H04N 21/234318 380/43 |
| 2002/0077988 A1* | 6/2002 | Sasaki | G06F 21/10 705/59 |
| 2004/0028227 A1* | 2/2004 | Yu | H04L 63/0428 380/201 |
| 2005/0192904 A1* | 9/2005 | Candelore | H04L 9/0861 705/51 |
| 2006/0047957 A1* | 3/2006 | Helms | G06F 21/10 713/165 |
| 2007/0083467 A1* | 4/2007 | Lindahl | G11B 20/00086 705/50 |
| 2007/0168853 A1* | 7/2007 | Jarman | G11B 27/105 715/205 |
| 2009/0193483 A1* | 7/2009 | Hwang | H04N 21/235 725/110 |
| 2010/0005483 A1* | 1/2010 | Rao | H04N 7/17318 725/25 |
| 2010/0008500 A1* | 1/2010 | Lisanke | G06F 21/10 380/201 |
| 2011/0125998 A1* | 5/2011 | Jeon | H04L 63/0428 713/150 |
| 2011/0145560 A1* | 6/2011 | Moon | H04N 21/234327 713/150 |
| 2011/0194688 A1* | 8/2011 | Le Barz | H04N 7/1675 380/217 |
| 2012/0114308 A1* | 5/2012 | Friedman | G06F 17/241 386/278 |
| 2012/0163593 A1* | 6/2012 | Lejeune | H04N 21/23476 380/200 |
| 2015/0070516 A1* | 3/2015 | Shoemake | H04N 21/42203 348/207.11 |
| 2016/0191923 A1* | 6/2016 | Dutt | H04N 19/176 375/240.14 |
| 2016/0275300 A1* | 9/2016 | Ko | G06F 21/602 |
| 2016/0314052 A1* | 10/2016 | Gladwin | H04L 67/06 |
| 2017/0163423 A1* | 6/2017 | Kim | H04N 21/4408 |

FOREIGN PATENT DOCUMENTS

| | | | | |
|---|---|---|---|---|
| EP | 3139621 A1 * | 3/2017 | | H04N 21/4408 |
| JP | 10-066052 A | 3/1998 | | |
| KR | 10-2011-0066464 A | 6/2011 | | |
| KR | 10-2013-0056985 A | 5/2013 | | |
| KR | 20130056985 A * | 5/2013 | | |

OTHER PUBLICATIONS

Search Report dated Jun. 25, 2015, issued by the International Searching Authority in counterpart International Patent Application No. PCT/KR2015/004456 (PCT/ISA/210).
Written Opinion dated Jun. 25, 2015, issued by the International Searching Authority in counterpart International Patent Application No. PCT/KR2015/004456 (PCT/ISA/237).
Notice of Allowance dated Sep. 18, 2015, issued by the Korean Intellectual Property Office in counterpart Korean Patent Application No. 10-2014-0053628.
Moffaert, et al., "Digital Rights Management: DRM is a key enabler for the future growth of the broadband access market, and the telecom/networking market in general", Apr. 1, 2003, Alcatel Telecommunications Review, 2nd Quarter 2003, 9 pages total.
Zhang, et al., "A Flexible Content Protection System for Media-on-Demand" Dec. 11, 2002, Proceedings of the IEEE Fourth International Symposium on Multimedia Software Engineering, 6 pages total.
Communication dated Sep. 4, 2017, issued by the European Patent office in counterpart European Application No. 15786782.1.
Communication dated Nov. 27, 2018, issued by the State Intellectual Property Office of P.R. China in counterpart Chinese Application No. 201580022842.X.
Communication dated Jul. 19, 2019, issued by the State Intellectual Property Office of P.R. China in counterpart Chinese Application No. 201580022842.X, English translation.
Communication dated Oct. 21, 2019 issued by the Indian Intellectual Property Office in counterpart Indian Application No. 201627027994, English translation.

* cited by examiner

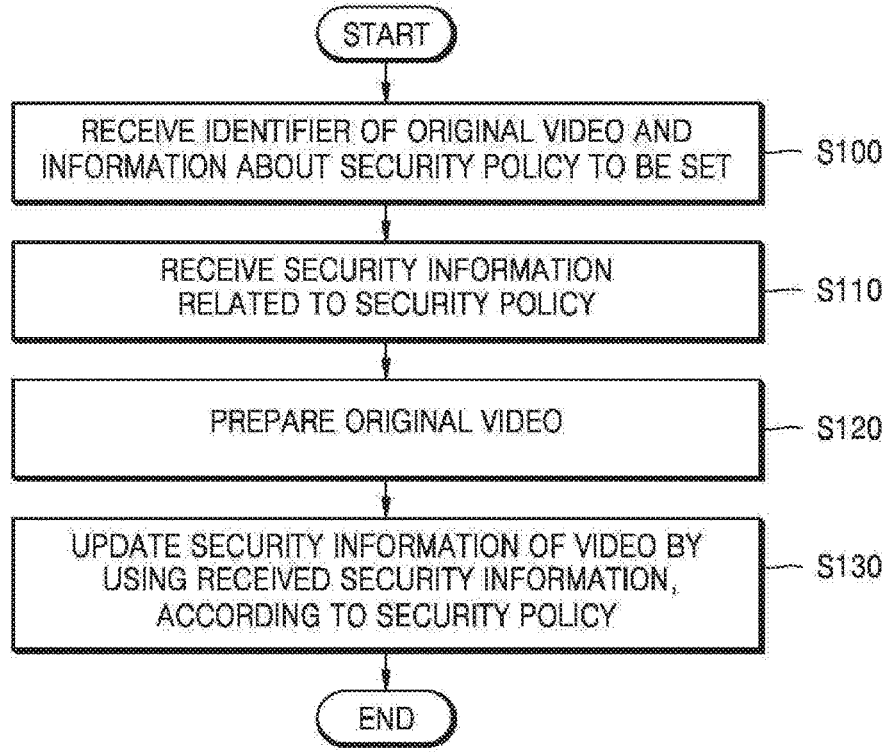
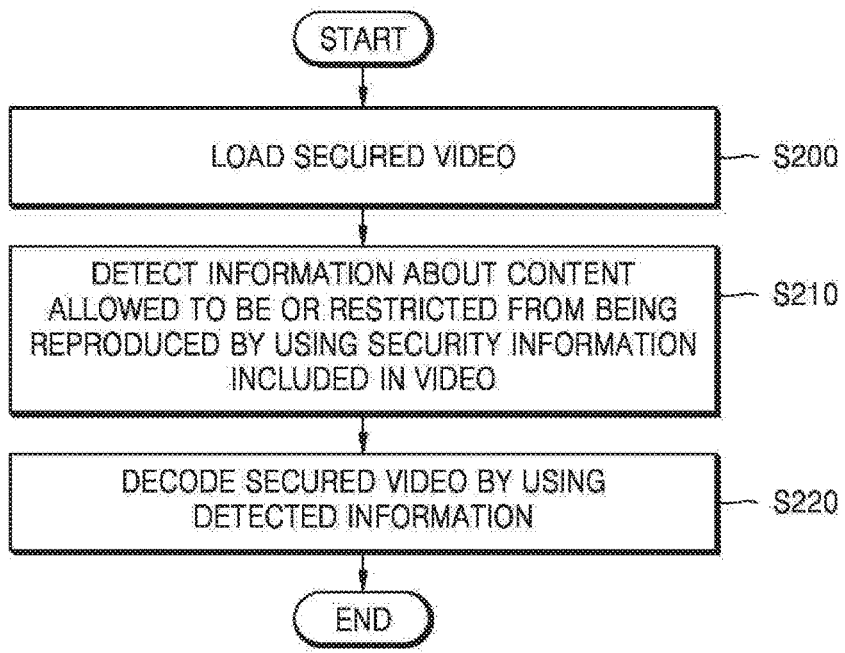

DEVICE AND METHOD FOR PROCESSING VIDEO

RELATED APPLICATIONS

This application is a National stage entry of International Application No. PCT/KR2015/004456, filed on May 1, 2015, which claims priority from Korean Patent Application No. 10-2014-0053628, filed May 2, 2014, in the Korean Intellectual Property Office. The disclosures of each of the applications are herein incorporated by reference in their entirety.

TECHNICAL FIELD

The present invention relates to a video processing device and method, which are capable of managing a security level of content included in the video.

BACKGROUND ART

Video capturing apparatuses, such as cameras or camcorders, are widely supplied not only to expert consumers but also to general consumers. Recently, according to development of digital technology, digital video capturing apparatuses have been supplied. Specifically, the digital video capturing apparatuses are supplied by being included in portable terminals, such as smart phones or tablet personal computers (PCs).

Also, according to wide supply of the Internet and development of Internet services, an environment in which videos are easily shared is being built. Technology for protecting digital copyright is being developed to restrict indiscreet sharing when content included in a video has copyright.

Specifically, regarding a video to which digital rights management (DRM) technology is applied, a license of content included in the video may be managed. Such a video is reproduced after the license is checked, and thus only a person having a just right is able to consume the content.

However, when the video is shared after the DRM technology applied to the video is removed by a cracker or a hacker, copyright of the content included in the video may be infringed.

DETAILED DESCRIPTION OF THE INVENTION

Technical Problem

The present invention provides a video processing device and method, which are capable of managing a security level of content included in a video.

Technical Solution

According to an aspect of the present invention, there is provided a video processing device and method, which are capable of restricting reproducing of at least a portion of content included in a video according to a level of right set to a video reproducing device reproducing the video.

Advantageous Effects

According to one or more embodiments, a security level of content included in a video may be managed.

Also, reproducing of at least a portion of content included in a video may be restricted according to a level of right set to a video reproducing device reproducing the video.

DESCRIPTION OF THE DRAWINGS

FIG. 7 is a flowchart of processes of performing a video processing method for generating a video, according to an embodiment.

FIG. 8 is a flowchart of processes of performing a video processing method for decoding a secured video, according to an embodiment.

BEST MODE

Figure 1:
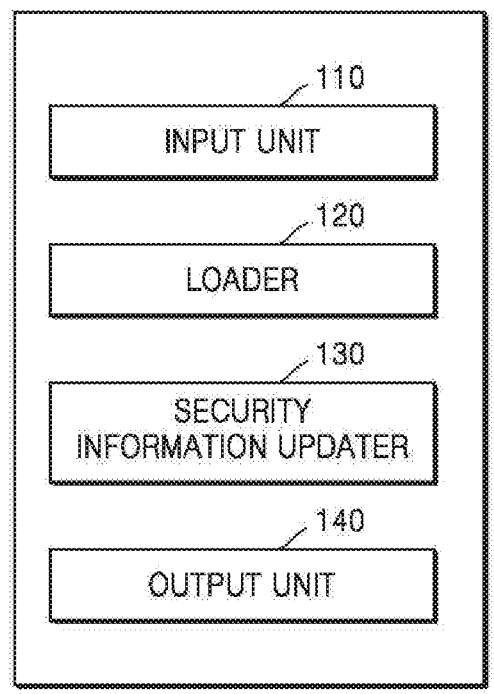
FIG. 1 is a block diagram of a structure of a video processing device generating a video, according to an embodiment.

According to one or more embodiments, a video processing method includes: receiving an identifier of a video and information about a security policy to be set to the video; receiving security information related to the security policy; preparing the video by using the received identifier of the video; and updating security information of the prepared video by using the received security information according to the security policy.

The receiving of the identifier of the video and the information about the security policy to be set to the video may include receiving a selection of a security policy from among a first security policy in which a certain portion of the video is reproduced only by a certain video reproducing device and a second security policy in which entire portion of the video is reproduced by any video reproducing device.

The receiving of the identifier of the video and the information about the security policy to be set to the video may include receiving a selection of the first security policy, and the updating of the security information of the prepared video may include inserting at least a portion of the received security information to the prepared video.

The receiving of the identifier of the video and the information about the security policy to be set to the video may include receiving a selection of the first security policy, and the updating of the security information of the prepared video may include, when security information already inserted to the prepared video exists, replacing the already inserted security information by at least a portion of the received security information.

The receiving of the identifier of the video and the information about the security policy to be set to the video may include receiving a selection of the second security policy, and the updating of the security information of the prepared video may include, when security information already inserted to the prepared video exists, removing the already inserted security information.

The receiving of the identifier of the video and the information about the security policy to be set to the video may include receiving a selection of the first security policy, and the receiving of the security information may include receiving, as the security information, an identifier of a video reproducing device allowed to reproduce the video or an identifier of a user of the video reproducing device, and information about content allowed to be or restricted from being reproduced by the video reproducing device, from among content included in the video.

A certain scene included in the video may include the content allowed to be reproduced by the video reproducing device and the content restricted from being reproduced by the video reproducing device, and the updating of the security information of the prepared video may include updating the security information of the prepared video such that only a portion of the certain screen where the content restricted from being reproduced is located is scrambled by the video reproducing device.

The receiving of the security information may include receiving a maximum number of times or a reproducible period the video is allowed to be reproduced by a video reproducing device.

The preparing of the video may include: loading the video by using the received identifier of the video; and encoding the loaded video.

The updating of the security information of the prepared video may include inserting at least a portion of the received security information to the prepared video.

The updating of the security information of the prepared video may include, when security information already inserted to the prepared video exists, replacing the already inserted security information by at least a portion of the received security information.

The updating of the security information of the prepared video may include, when security information already inserted to the prepared video exists, removing the already inserted security information.

According to one or more embodiments, a video processing device includes: an input unit configured to receive an identifier of a video, information about a security policy to be set to the video, and security information related to the security policy; a loader configured to prepare the video by using the received identifier of the video; and a security information updater configured to update security information of the prepared video by using the received security information according to the security policy.

The input unit may be further configured to receive a selection of a security policy from among a first security policy in which a certain portion of the video is reproduced only by a certain video reproducing device and a second security policy in which entire portion of the video is reproduced by any video reproducing device.

The input unit may receive a selection of the first security policy, and the security information updater may insert at least a portion of the received security information to the prepared video.

The security information updater may, when security information already inserted to the prepared video exists, replace the already inserted security information by at least a portion of the received security information.

The input unit may receive a selection of the second security policy, and the security information updater may, when security information already inserted to the prepared video exists, remove the already inserted security information.

The input unit may receive a selection of the first security policy, and the security information may include an identifier of a video reproducing device allowed to reproduce the video or an identifier of a user of the video reproducing device, and information about content allowed to be or restricted from being reproduced by the video reproducing device, from among content included in the video.

A certain scene included in the video may include the content allowed to be reproduced by the video reproducing device and the content restricted from being reproduced by the video reproducing device, and the security information updater may update the security information of the prepared video such that only a portion of the certain screen where the content restricted from being reproduced is located is scrambled by the video reproducing device.

The security information may further include a maximum number of times or a reproducible period the video is allowed to be reproduced by a video reproducing device.

MODE OF THE INVENTION

Advantages and features of one or more embodiments of the present invention and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present invention will only be defined by the appended claims. Like reference numerals refer to like elements throughout the specification.

While such terms as "first", "second", etc., may be used to describe various components, such components must not be limited to the above terms. The above terms are used only to distinguish one component from another. Accordingly, a first element mentioned hereinafter may refer to a second element within the technical aspect of the present invention.

The terms used in the present specification are merely used to describe particular embodiments, and are not intended to limit the present invention. An expression used in the singular encompasses the expression in the plural, unless it has a clearly different meaning in the context. In the present specification, it is to be understood that the term such as "comprises" or "comprising" are not intended to preclude the possibility that one or more other features, numbers, steps, actions, components, parts, or combinations thereof may exist or may be added.

Unless otherwise defined, all terms used herein have the same meanings as commonly understood by one of ordinary skill in the art to which this invention belongs.

It will be further understood that terms such as those defined in commonly used dictionaries should be interpreted as having meanings that are consistent with their meanings in the context of the relevant art and will not be interpreted in an idealized or overly formal sense unless expressly so defined herein.

Hereinafter, a video processing device and method according to embodiments will be described in detail with reference to FIGS. 1 through 8.

FIG. 1 is a block diagram of a structure of a video processing device 100 generating a video, according to an embodiment. Referring to FIG. 1, the video processing device 100 may include an input unit 110, a loader 120, a security information updater 130, and an output unit 140.

The input unit 110 may receive information from an external source. The input unit 110 may include, for example, a touch screen, a keyboard, a mouse, a track ball, a touch pad, or another input device. The input unit 110 may receive information from a user of the video processing device 100. The input unit 110 may receive an identifier of an original video from the user. The user may select one original video from a list of original videos displayed on a touch screen. According to another embodiment, the user may directly input a file name of the original video by using the input unit 110.

Also, the input unit 110 may receive, from the user, information about a security policy to be set to the original video. The user may select one of at least two different security policies. The input unit 110 may receive information about the selected security policy from the user. The video processing device 100 may generate a secured video or a general video by using the original video and the received security policy.

For example, the user may select one of a first security policy and a second security policy. According to the first security policy, a security mode in which a certain portion of a video is reproducible by a certain user or a certain video reproducing device may be supported. Also, according to the second security policy, a general mode in which the entire portion of a video is reproducible by any user or any video reproducing device may be supported.

When a security policy selected by the user is the first security policy, the input unit 110 may receive security information related to a security policy to be set to the original video from the user. For example, the security information may include an identifier of a video reproducing device having a right to reproduce the video. According to another embodiment, the security information may include an identifier of another user having a right to reproduce the video. In other words, when an identifier of a user who logged in by using a video reproducing device is included in an identifier list of users having a right to reproduce the video, the user who logged in may reproduce the video by using the video reproducing device.

The user of the video processing device 100 may input or select an identifier of a target device to be allowed to reproduce the video, through the input unit 110. According to another embodiment, the user of the video processing device 100 may input or select an identifier of a target user to be allowed to reproduce the video, through the input unit 110.

There may be one or more video reproducing devices or users having the right to reproduce the video. Thus, when there are a plurality of video reproducing devices or users having the right to reproduce the video, the security information may include a list of identifiers of the plurality of video reproducing devices or users. The video reproducing device or user having the right to reproduce the video may be any video reproducing device or any user.

Also, the video reproducing devices or users included in the list may have different reproduction rights. Accordingly, the security information may include information about the reproduction right corresponding to each of the video reproducing devices or users.

The information about the reproduction right may include information about content allowed to be reproduced or information about content restricted from being reproduced from among content included in the video. Accordingly, the security information may include an identifier of a video reproducing device or user, information about content allowed to be reproduced by the video reproducing device or user, or information about content restricted from being reproduced by the video reproducing device or user.

For example, it is assumed that a screen included in the video includes a human portion and a background portion. A first video reproducing device may be restricted from reproducing both the human portion and the background portion from among the content included in the video. Also, a second video reproducing device may be restricted from reproducing the human portion and allowed to reproduce the background portion. Also, a third video reproducing device may be allowed to reproduce the human portion and restricted from reproducing the background portion. Also, a fourth video reproducing device may be allowed to reproduce both the human portion and the background portion. The security information may include information about a portion allowed to be or restricted from being reproduced by each of the first through fourth video reproducing devices.

The user of the video processing device 100 may input or select information about a portion allowed to be or restricted from being reproduced by a target device or a target user from among the content included in the video, through the input unit 110.

Also, the security information may further include a maximum number of times or a reproducible period the video is allowed to be reproduced by the target device or the target user. The user of the video processing device 100 may input or select the maximum number of times or the reproducible period to be allowed to the target device or the target user, through the input unit 110.

When a security policy selected by the user is the second security policy, the input unit 110 may not need to receive the security information from the user.

The loader 120 may prepare the original video. The loader 120 may load the original video by using the received identifier of the original video. The original video may include original video data in an un-encoded state. According to another embodiment, the original video may be a secured video already generated according to the first security policy or a video already generated according to the second security policy.

When the original video is a video in an un-encoded state, the loader 120 may encode the loaded original video. The loader 120 may encode the original video by using a codec. The encoded video may include a header and a payload. The payload may include a result obtained by encoding the original video. The header may include information about the encoded video, information about the payload, or information about the result obtained by encoding the original video.

When the original video is the secured video already generated according to the first security policy or the video already generated according to the second security policy, the loader 120 may not encode the loaded original video again.

When the original video is a video in an un-encoded state and a security policy selected through the input unit 110 is the first security policy, the security information updater 130 may generate a secured video by inserting the received security information to the encoded video.

The security information updater 130 may insert at least a portion of the security information received by the input unit 110 to the encoded video. The security information updater 130 may insert the at least a portion of the received security information as it is or after converting it to another format. The security information updater 130 may further insert a time when the secured video is generated or the identifier of the video processing device 100 that generated the secured video to the encoded video.

The security information updater 130 may insert the security information to the header of the encoded video. According to another embodiment, the security information updater 130 may insert the security information to the payload of the encoded video. According to another embodiment, the security information updater 130 may insert the security information into the original video before being encoded.

The original video may include many pixels. Thus, a viewer may not notice even when the original video data corresponding to some of the pixels is changed to another data. Before the loader 120 encodes the original video, the security information updater 130 may overwrite the security information on a portion where the original video data corresponding to the some pixels included in the original video is recorded. In other words, the security information updater 130 may overwrite the security information on pixel data corresponding to the some pixels included in the original video. The loader 120 may encode the original video to which the security information is inserted.

As such, when the security information is inserted to the head, the payload, or the original video, it may be difficult for a hacker or a cracker to hack the security information. Accordingly, security of the content included in the video may be reinforced.

Figure 2:
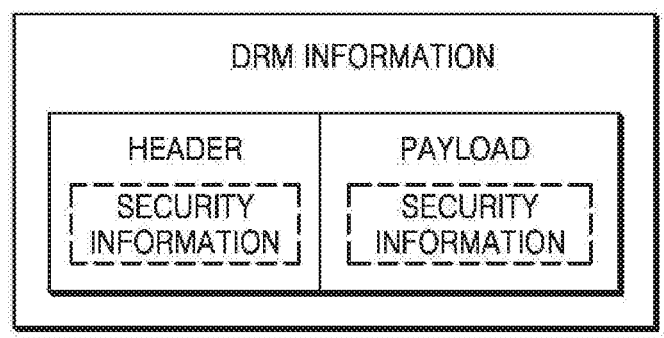
FIG. 2 is a structural diagram showing a structure of a secured video to which security information is inserted and digital rights management (DRM) is applied.

The security information updater 130 may additionally apply digital rights management (DRM) to the video to which the security information is inserted. In other words, the security information updater 130 may further insert DRM information to the video to which the security information is inserted. According to another embodiment, the security information updater 130 may not apply additional DRM to the video to which the security information is inserted. In other words, the secured video may be a result obtained by applying DRM to the video to which the security information is inserted, or may be a video to which additional DRM is not applied and to which the security information is inserted. FIG. 2 is a structural diagram showing a structure of a secured video to which security information is inserted and DRM is applied.

When the original video is a video in an un-encoded state and a security policy selected through the input unit 110 is the second security policy, the security information updater 130 may not need to insert any security information to the encoded video.

When the original video is a secured video already generated according to the first security policy and a security policy selected through the input unit 110 is the first security policy, the security information updater 130 may replace security information already inserted to the original video by the received security information.

When the original video is a secured video already generated according to the first security policy and a security policy selected through the input unit 110 is the second security policy, the security information updater 130 may remove security information already inserted to the original video.

When the original video is a video already generated according to the second security policy and a security policy selected through the input unit 110 is the first security policy, the security information updater 130 may generate a secured video by inserting the received security information to the original video.

When the original video is a video already generated according to the second security policy and a security policy selected through the input unit 110 is the second security policy, the security information updater 130 may not need to insert any security information to the original video.

The output unit 140 may transmit the secured video generated as such to an external destination.

Figure 3:
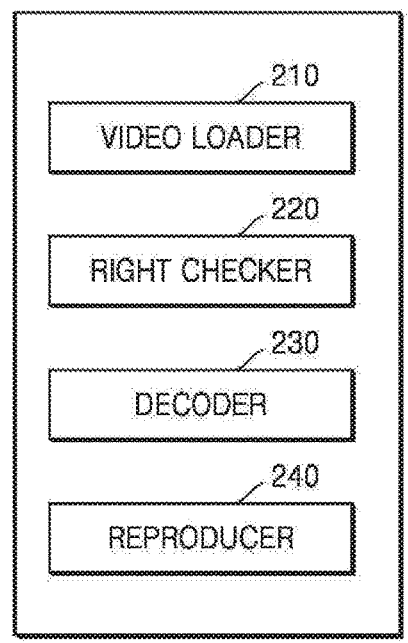
FIG. 3 is a block diagram of a structure of a video processing device decoding a secured video, according to an embodiment.

FIG. 3 is a block diagram of a structure of a video processing device 200 decoding a secured video, according to an embodiment. Referring to FIG. 3, the video processing device 200 may include a video loader 210, a right checker 220, a decoder 230, and a reproducer 240.

The video loader 210 may load a video secured according to the first security policy.

The right checker 220 may detect information about content allowed to be or restricted from being reproduced by the video processing device 220, from among content included in the secured video by using security information included in the secured video. When DRM is applied to the secured video, the right checker 220 may access the security information by using a license corresponding to the DRM. In other words, when the secured video further includes DRM information, the right checker 220 may access the security information by using a license corresponding to the DRM information. Also, the right checker 220 may further detect whether a maximum number of times of reproducing the secured video is already reached or a reproducible period of reproducing the secured video is already passed by using the security information.

The decoder 230 may decode the secured video by using the detected information. The decoder 230 may decode at least a portion of the content included in the secured video to be not normally reproduced according to the information about the content allowed to be or restricted from being reproduced by the video processing device 200. For example, the decoder 230 may perform scrambling on a portion restricted from being reproduced from among the content included in the video. According to another embodiment, the decoder 230 may decode the portion restricted from being reproduced from among the content included in the video, by using an entropy codec. According to another embodiment, the decoder 230 may insert a watermark to the portion restricted from being reproduced from among the content included in the video.

A certain screen included in the secured video may include both content allowed to be reproduced and content restricted from being reproduced. In this case, the decoder 230 may perform scrambling on or insert watermark to a portion where the content restricted from being reproduced is located in the certain screen.

Figure 4:
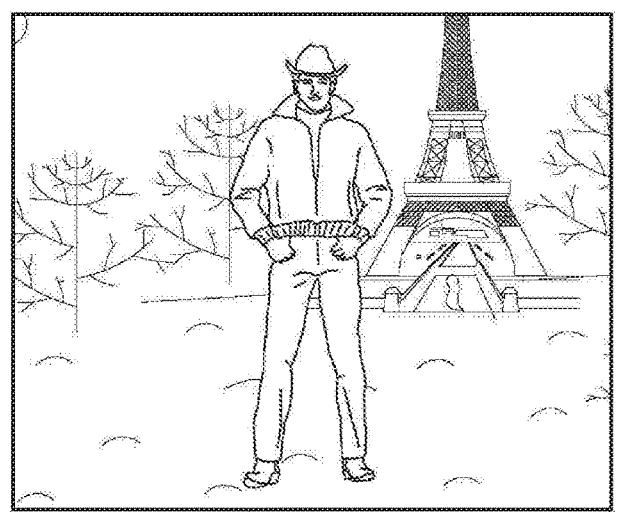
FIG. 4 illustrates one scene included in an original video.
Figure 5:
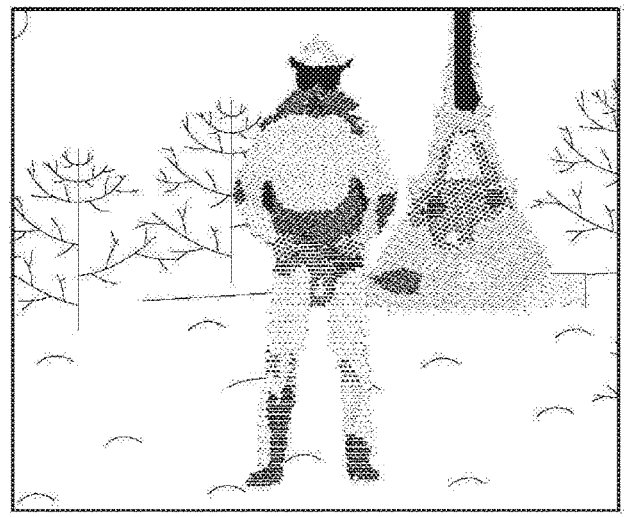
FIG. 5 illustrates a result of decoding a region corresponding to the scene of FIG. 4 by using a video processing device having a first right with respect to reproducing of a secured video.
Figure 6:
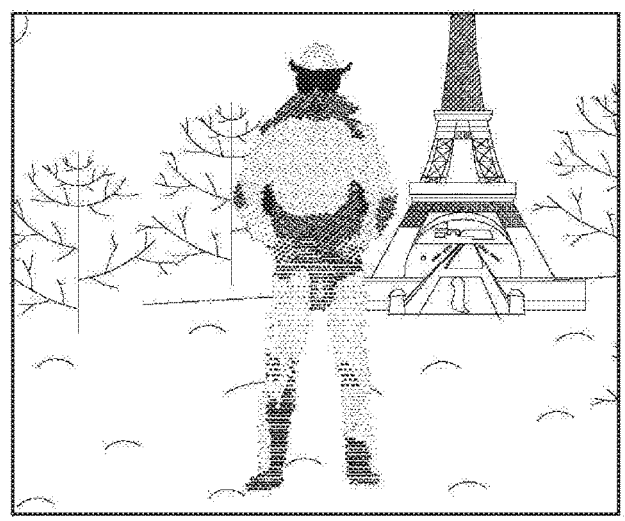
FIG. 6 illustrates a result of decoding a region corresponding to the scene of FIG. 4 by using a video processing device having a second right with respect to reproducing of a secured video.

FIG. 4 illustrates one scene included in an original video. For example, when all content included in a secured video is allowed to be reproduced, a decoding result of the decoder 230 may be the same as the screen of FIG. 4. Also, when a human portion and an artifact portion are restricted from being reproduced from among the content included in the secured video, a decoding result of the decoder 230 may be the same as a scene of FIG. 5. Also, when a human portion is restricted from being reproduced and an artifact portion is allowed to be reproduced from among the content included in the secured video, a decoding result of the decoder 230 may be the same as a screen of FIG. 6.

The reproducer 240 may reproduce the video decoded as such.

FIG. 7 is a flowchart of processes of performing a video processing method for generating a secured video, according to an embodiment. Referring to FIG. 7, first, an identifier of an original video and information about a security policy to be set on the original video are received in operation S100. The input unit 110 may receive the identifier of the original video from the user. Also, the user may select one of a first security policy supporting a security mode and a second security policy supporting a general mode, through the input unit 110.

Then, security information related to the security policy may be received in operation S110. When a security policy selected by the user is the first security policy, the input unit 110 may receive the security information related to the security policy from the user. The input unit 110 may receive, from the user, an identifier of a target device or target user allowed to reproduce the video, and information about content allowed to be or restricted from being reproduced by the target device or target user from among content included in the video. The input unit 110 may further receive a maximum number of times or a reproducible period the video is allowed to be reproduced by the target device or target user, from the user.

Then, the original video may be prepared in operation S120. The loader 120 may load the original video by using the received identifier of the original video. When the original video is a video in an un-encoded state, the loader 120 may encode the loaded original video. When the original video is a video already generated according to the first security policy or the second security policy, the loader 120 may not encode the loaded original video again.

Then, security information of the prepared video may be updated in operation S130 by using the received security information, according to the security policy. The security information updater 130 may insert at least a portion of the received security information to the prepared video, replace security information already inserted to the prepared video by at least a portion of the received security information, or remove the security information already inserted to the prepared video.

When the received security policy is the first security policy and the prepared video does not include security information, the security information updater 130 may insert at least a portion of the received security information to the prepared video. When the received security policy is the first security policy and security information is already inserted to the prepared video, the security information updater 130 may replace the security information already inserted to the prepared video by at least a portion of the received security information. When the received security policy is the second security policy and security information is already inserted into the prepared video, the security information updater 130 may remove the security information already inserted to the prepared video.

The security information updater 130 may generate secured video by inserting at least a portion of the received security information to the prepared video or replacing the security information already inserted to the prepared video by at least a portion of the received security information.

FIG. 8 is a flowchart of processes of performing a video processing method for decoding a secured video, according to an embodiment. Referring to FIG. 8, first, a secured video may be loaded in operation S200. The video loader 210 may load the secured video.

Then, information about content allowed to be or restricted from being reproduced from among content included in the secured video may be detected in operation S210 by using security information included in the loaded secured video. The right checker 220 may detect the information about the content allowed to be or restricted from being reproduced by using the security information.

Then, the secured video may be decoded by using the detected information, in operation S220. The decoder 230 may decode some of the content included in the secured video to be not normally reproduced according to the information about the content allowed to be or restricted from being reproduced.

According to one or more embodiments described above, a security level of content included in a video may be managed. Also, at least a portion of content included in a video may be restricted from being reproduced according to a level of right set in a video reproducing device reproducing the video.

While the present invention has been particularly shown and described with reference to exemplary embodiments thereof, it will be understood by those of ordinary skill in the art that various changes in form and details may be made therein without departing from the spirit and scope of the present invention as defined by the following claims. Hence, it will be understood that the embodiments described above are not limiting the scope of the invention.

The invention claimed is:

1. A video processing method comprising:
receiving an identifier of a video and information about a security policy to be set to the video;
receiving security information related to the security policy;
preparing the video by using the received identifier of the video; and
updating security information of the prepared video by using the received security information according to the security policy,
wherein the receiving of the identifier of the video and the information about the security policy to be set to the video comprises receiving a selection of a security policy from among a plurality of security policies including a restricted security policy; and receiving user information to select at least one second object including a static object related to the restricted security policy,
wherein the restricted security policy indicates, for each of a plurality of video reproducing devices, the at least one second object of the video which is to be reproduced abnormally, and
wherein when the restricted security policy is selected, a video reproducing device reproduces a portion representing a shape of a first object of the video while reproducing a portion representing a shape of the at least one second object of the video abnormally.

2. The video processing method of claim 1, wherein the receiving of the identifier of the video and the information about the security policy to be set to the video comprises receiving a selection of the restricted security policy, and
the updating of the security information of the prepared video comprises inserting at least a portion of the received security information into the prepared video.

3. The video processing method of claim 1, wherein the receiving of the identifier of the video and the information about the security policy to be set to the video comprises receiving a selection of the restricted security policy, and
the updating of the security information of the prepared video comprises, when security information already exists in the prepared video, replacing existing security information with at least a portion of the received security information.

4. The video processing method of claim 1, wherein the receiving of the identifier of the video and the information about the security policy to be set to the video comprises receiving a selection of other security policy than the restricted security policy, and
    the updating of the security information of the prepared video comprises, when security information already exists in the prepared video, removing existing security information from the prepared video.

5. The video processing method of claim 1, wherein the restricted security policy comprises an identifier of at least one video reproducing device that is allowed to reproduce the video or an identifier of a user of the at least one video reproducing device, and information about the first object or the at least one second object.

6. The video processing method of claim 1, wherein the receiving of the identifier of the video and the information about the security policy to be set to the video comprises receiving a selection of the restricted security policy,
    a certain scene included in the video comprises the at least one second object, and
    the updating of the security information of the prepared video comprises updating the security information of the prepared video to indicate that a portion representing the shape of the at least one second object of the certain scene is to be scrambled when the video is reproduced.

7. The video processing method of claim 1, wherein information related to the restricted security policy comprises a maximum number of times or a reproducible period of the video for the video reproducing device.

8. The video processing method of claim 1, wherein the preparing of the video comprises:
    loading the video by using the received identifier of the video; and
    encoding the loaded video.

9. The video processing method of claim 1, wherein the updating of the security information of the prepared video comprises inserting at least a portion of the received security information into the prepared video.

10. The video processing method of claim 1, wherein the updating of the security information of the prepared video comprises, when security information already exists in the prepared video, replacing existing security information with at least a portion of the received security information.

11. The video processing method of claim 1, wherein the updating of the security information of the prepared video comprises, when security information already exists in the prepared video, removing existing security information from the video.

12. A non-transitory computer-readable recording medium having recorded thereon a program, which when executed by a computer, performs the video processing method of claim 1.

13. A video processing device comprising:
    an input unit configured to receive an identifier of a video, information about a security policy to be set to the video, security information related to the security policy, and user information to select at least one second object including a static object related to a restricted security policy;
    a loader configured to prepare the video by using the received identifier of the video; and
    a security information updater configured to update security information of the prepared video by using the received security information according to the security policy,
    wherein the input unit is further configured to receive a selection of a security policy from among a plurality of security policies including a restricted security policy,
    wherein the restricted security policy indicates, for each of a plurality of video processing devices, the at least one second object of the video which is to be reproduced abnormally, and
    wherein when the restricted security policy is selected, the video processing device reproduces a portion representing a shape of a first object of the video while reproducing a portion representing a shape of the at least one second object of the video abnormally.

* * * * *